(12) United States Patent
Reel (10) Patent No.: US 7,832,794 B2
(45) Date of Patent: Nov. 16, 2010

(54) VEHICLE WITH HIDDEN PILLOWS FOR BED MODE

(75) Inventor: Travis Reel, Raymond, OH (US)

(73) Assignee: Honda Motor Co., Ltd., Tokyo (JP)

( * ) Notice: Subject to any disclaimer, the term of this patent is extended or adjusted under 35 U.S.C. 154(b) by 163 days.

(21) Appl. No.: 12/371,985

(22) Filed: Feb. 17, 2009

(65) Prior Publication Data
US 2010/0207427 A1 Aug. 19, 2010

(51) Int. Cl.
B60N 2/34 (2006.01)

(52) U.S. Cl. .............................. 296/190.02; 296/37.14; 296/37.15; 296/191

(58) Field of Classification Search .............. 296/37.14, 296/37.15, 190.02, 191, 65.09, 65.01, 69, 296/65.05
See application file for complete search history.

(56) References Cited

U.S. PATENT DOCUMENTS

| 1,725,807 A | 8/1929 | Leutz |
|---|---|---|
| 4,065,174 A | 12/1977 | Yokohama et al. |
| 4,277,859 A | 7/1981 | Seaman |
| 4,619,623 A | 10/1986 | Elverskog |
| 4,756,574 A | 7/1988 | Andres et al. |
| 5,257,846 A | 11/1993 | Kanai et al. |
| 5,342,109 A | 8/1994 | Berry et al. |
| 6,030,034 A * | 2/2000 | Plohetski ............... 297/188.06 |
| 6,102,463 A | 8/2000 | Swanson et al. |
| 6,175,978 B1 | 1/2001 | Nizzi et al. |
| 6,588,839 B1 | 7/2003 | Salzer |
| 6,934,989 B2 | 8/2005 | Ledvina et al. |
| 6,981,730 B2 | 1/2006 | Bixby |
| 7,213,877 B2 | 5/2007 | Gramss |
| 2006/0181110 A1 | 8/2006 | Rasmussen |

* cited by examiner

Primary Examiner—Lori L Lyjak
(74) Attorney, Agent, or Firm—Mark E. Duell, Esq.; Emerson Thomson Bennett (57) ABSTRACT

A vehicle may have a load floor with a load receiving surface that is supported to the frame and a panel having first and second sides, the second side having a storage cavity. The panel may be adjustable between: (1) a first position where the first side defines at least a portion of the load receiving surface and the second side defines no portion of the load receiving surface; and, (2) a second position where the first side defines no portion of the load receiving surface and the second side defines at least a portion of the load receiving surface. When the panel is in the first position, a pillow may be at least partially received within the storage cavity and it may be hidden. When the panel is in the second position, the pillow may not be hidden.

20 Claims, 8 Drawing Sheets

VEHICLE WITH HIDDEN PILLOWS FOR BED MODE

I. BACKGROUND OF THE INVENTION

A. Field of Invention

This invention pertains to the art of methods and apparatuses regarding vehicles with a bed mode, and more particularly to methods and apparatuses regarding a vehicle with a bed mode that provides a hidden pillow.

B. Description of the Related Art

It is known to provide automotive vehicles, such as vans, with the capability of being adjusted into a bed mode so that the vehicle itself may be used to sleep in. Especially with vehicles having a load floor, it is typical to use the load floor as a bed surface. To make known bed modes work well with comfort, however, the users must pack pillows for use in supporting their heads and/or other body portions. The difficultly with this is that pillows are well known to take up significant storage space, thereby lessening available cargo capacity.

What is needed is a vehicle that can be easily adjusted into a bed mode and that can conveniently store pillows without lessening available cargo capacity.

II. SUMMARY OF THE INVENTION

According to one embodiment of the invention, a vehicle comprises: a frame; a locomotion source supported to the frame for use in providing locomotion for the vehicle; an interior comprising: a load floor having a load receiving surface that is supported to the frame; and, a first panel having first and second sides, the second side comprising a storage cavity. The first panel is adjustable between: (1) a first position where the first side defines at least a portion of the load receiving surface and the second side defines no portion of the load receiving surface; and, (2) a second position where the first side defines no portion of the load receiving surface and the second side defines at least a portion of the load receiving surface. The vehicle may also comprise a first pillow. When the first panel is in the first position, the first pillow is at least partially received within the storage cavity and, the first pillow is hidden. When the first panel is in the second position, the first pillow is not hidden.

According to another embodiment of the invention, a method comprises the steps of: (A) providing a vehicle comprising: a frame; a locomotion source supported to the frame for use in providing locomotion for the vehicle; and, an interior comprising a load floor having a load receiving surface that is supported to the frame; (B) providing a panel having first and second sides, the second side comprising a storage cavity; (C) providing a pillow; (D) adjusting the panel: (1) from a first position where the first side defines at least a portion of the load receiving surface, the second side defines no portion of the load receiving surface, the pillow is at least partially received within the storage cavity and, the pillow is hidden; (2) to a second position where the first side defines no portion of the load receiving surface, the second side defines at least a portion of the load receiving surface and, the pillow is not hidden.

According to yet another embodiment of the invention, a vehicle comprises: a frame; a locomotion source supported to the frame for use in providing locomotion for the vehicle; at least a first ground engaging wheel supported to the frame; an interior comprising: a first seat assembly that supports an associated person in a sitting position and that is supported to the frame; a second seat assembly that is supported to the frame, the second seat assembly comprising a panel having first and second sides, the second side comprising a storage cavity; and, a load floor having a load receiving surface that is supported to the frame. The second seat assembly is adjustable between: (1) a first position where the second seat assembly supports an associated person in a sitting position; and, (2) a second position where the panel is substantially coplanar with at least a portion of the load receiving surface. The panel is adjustable when the second seat assembly is in the second position between: (1) a first position where the first side defines at least a portion of the load receiving surface and the second side defines no portion of the load receiving surface; and, (2) a second position where the first side defines no portion of the load receiving surface and the second side defines at least a portion of the load receiving surface. The vehicle also comprises a pillow. When the panel is in the first position, the pillow is at least partially received within the storage cavity and, the pillow is hidden. When the panel is in the second position, the pillow is not hidden.

One advantage of this invention is that a vehicle can be easily adjusted into and out of a bed mode.

Another advantage of this invention is that a vehicle can be easily adjusted to store pillows without lessening available cargo capacity Still other benefits and advantages will become apparent to those skilled in the art to which it pertains upon a reading and understanding of the following detailed specification.

III. BRIEF DESCRIPTION OF THE DRAWINGS

The invention may take physical form in certain parts and arrangement of parts, embodiments of which will be described in detail in this specification and illustrated in the accompanying drawings which form a part hereof and wherein.

IV. DETAILED DESCRIPTION OF THE INVENTION

Figure 1:
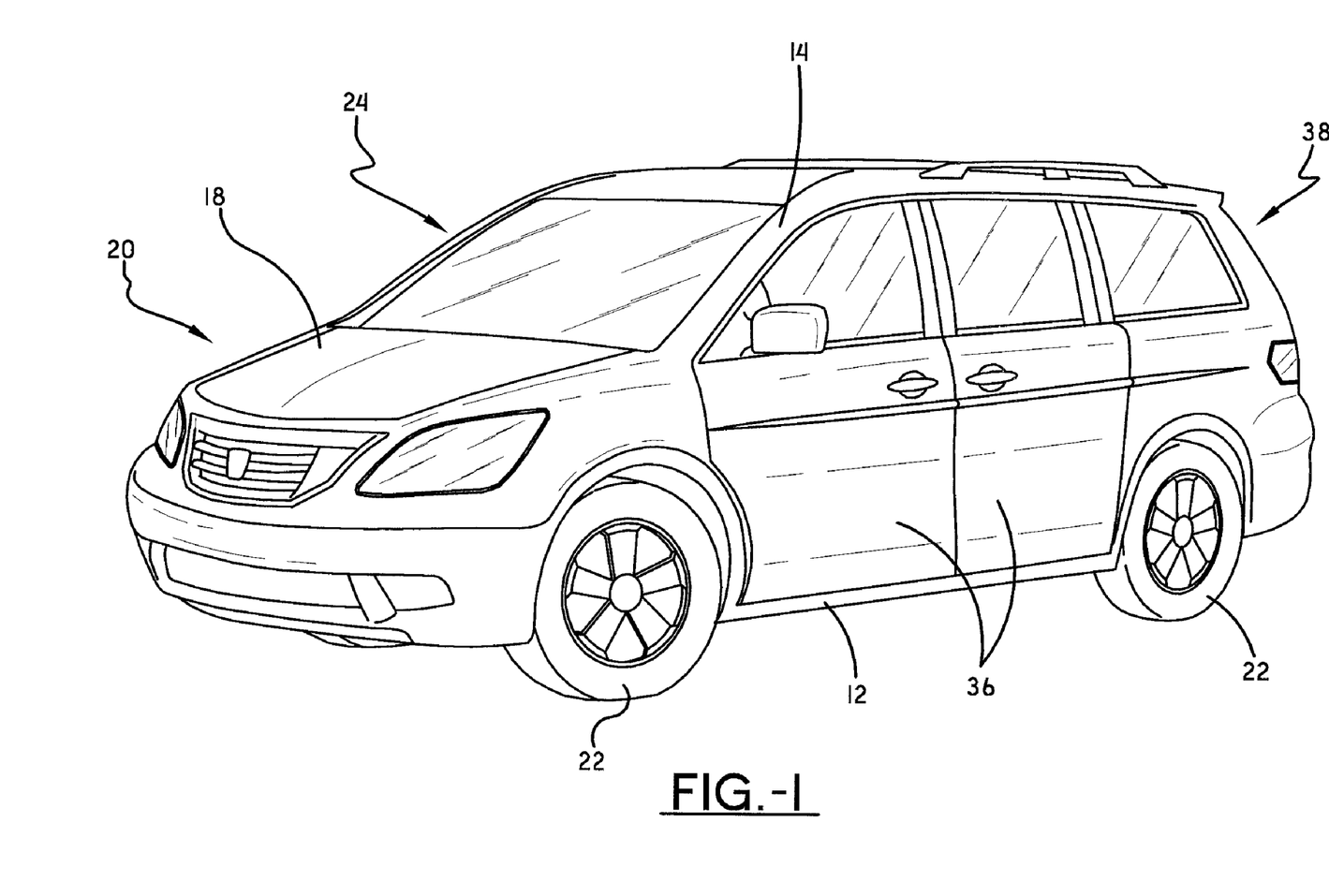
FIG. 1 is a perspective view of a vehicle.
Figure 2:
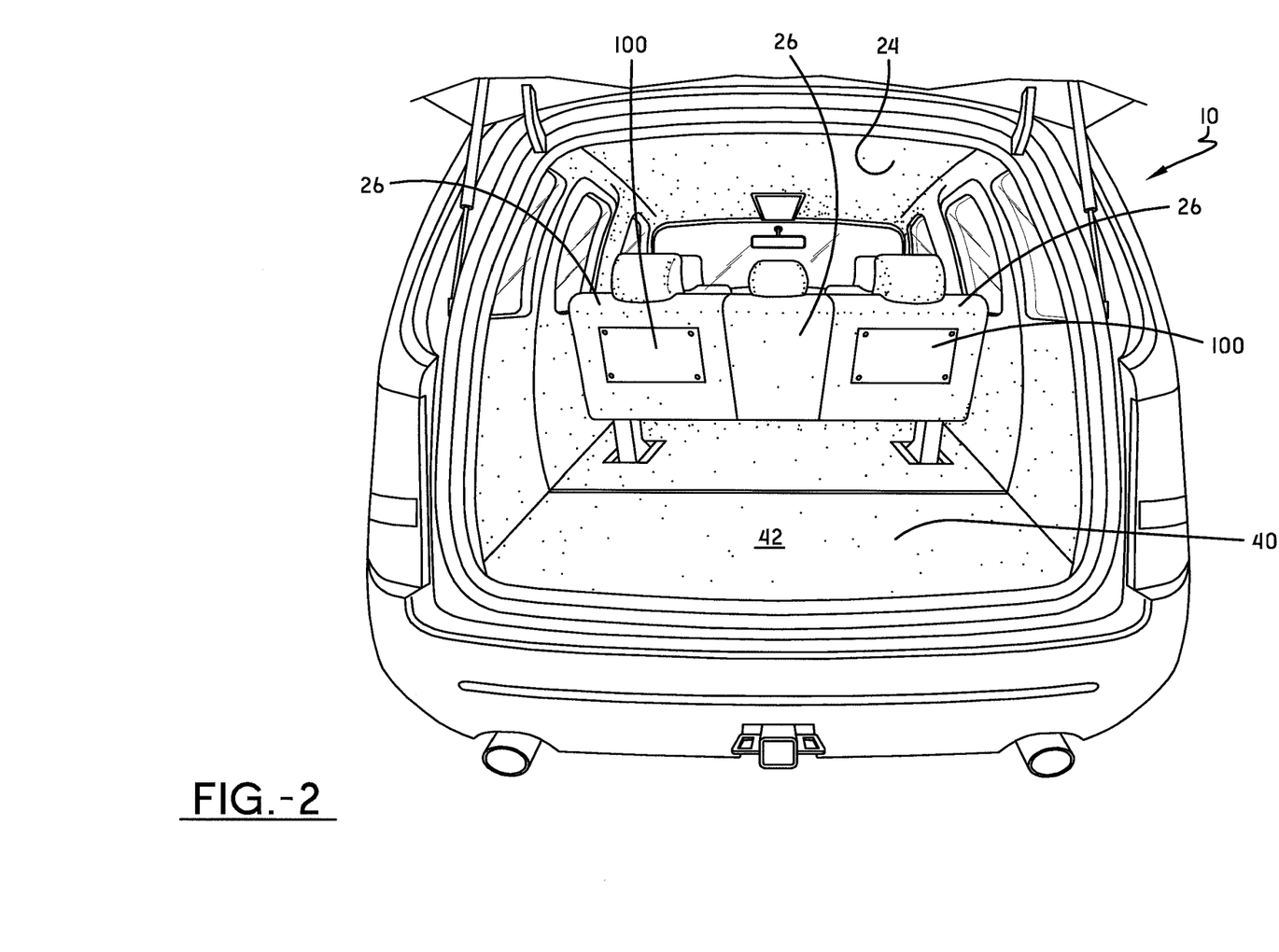
FIG. 2 is a back view of the vehicle shown in FIG. 1 with the back hatch raised to reveal the load floor and the backs of seat assemblies adjusted to support persons in sitting positions.
Figure 4:
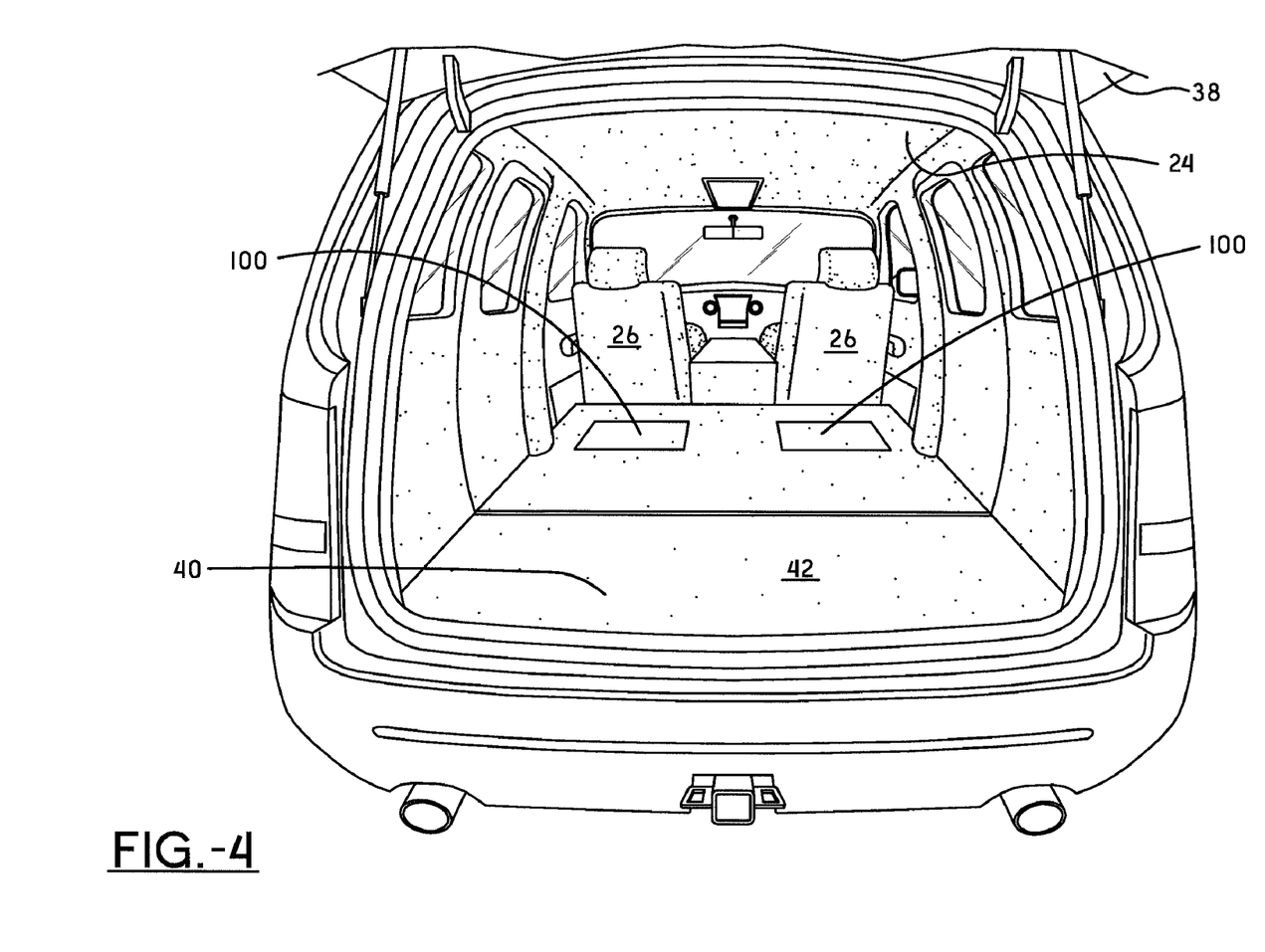
FIG. 4 is a view similar to that shown in FIG. 2 but with the seat assemblies adjusted into a bed mode with the panels adjusted so that the pillows are hidden.
Figure 5:
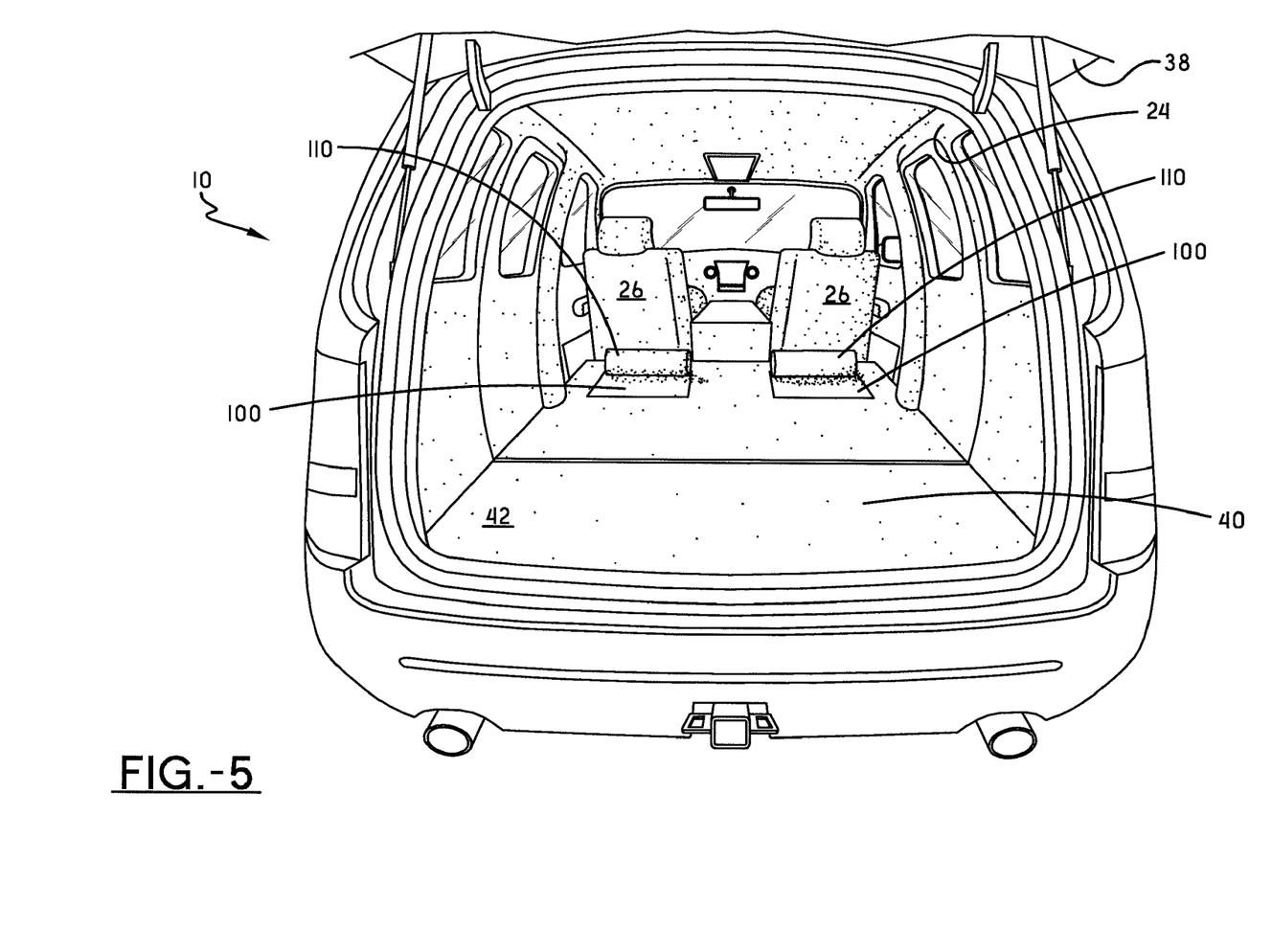
FIG. 5 is a view similar to that shown in FIG. 4 but with the panels adjusted so that the pillows are not hidden.
Figure 6:
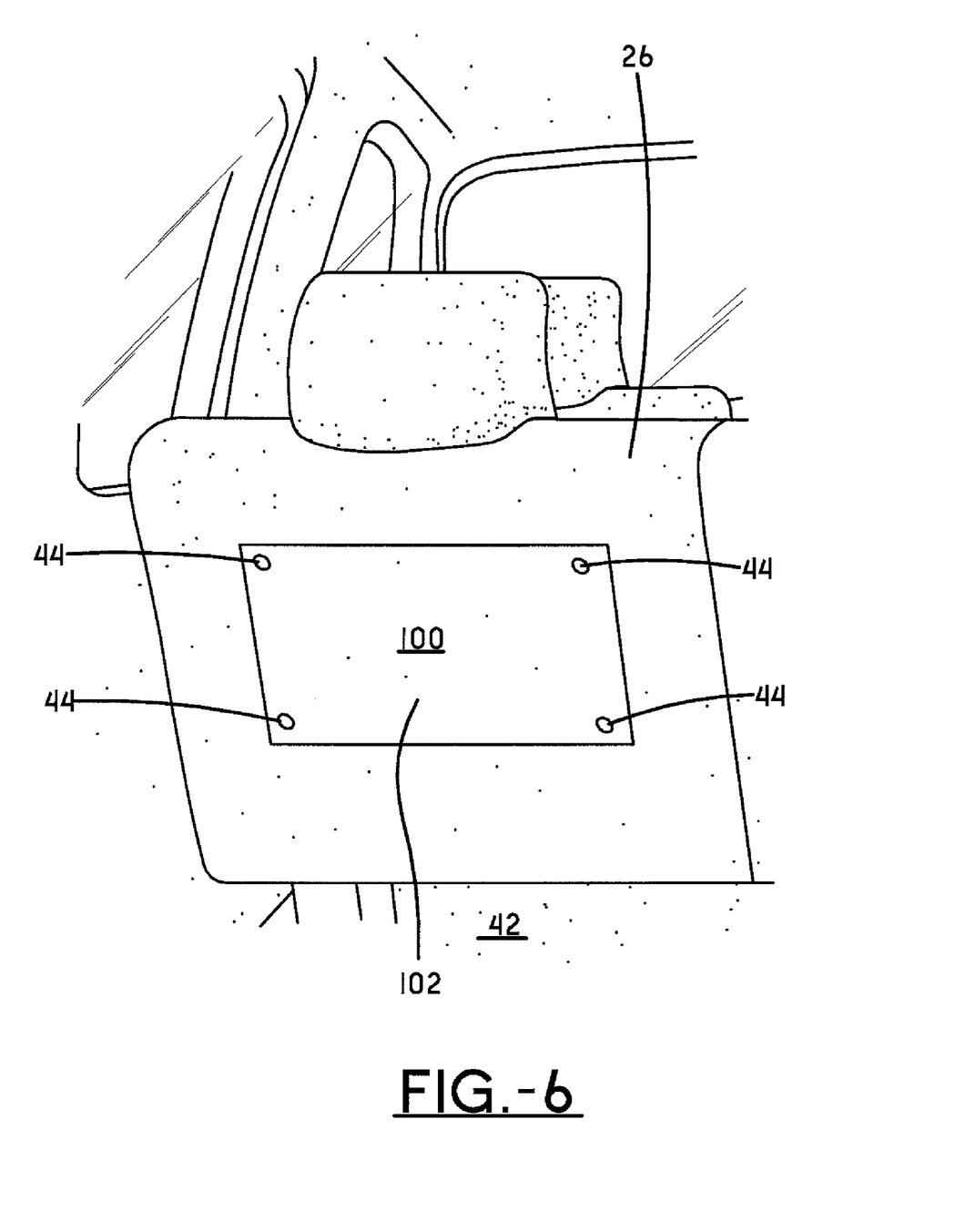
FIG. 6 is a close up back view of a panel attached to a seat assembly according to one embodiment of this invention.

Referring now to the drawings wherein the showings are for purposes of illustrating embodiments of the invention only and not for purposes of limiting the same, and wherein like reference numerals are understood to refer to like components, FIGS. 1-2 and 4-6 show a vehicle 10 equipped with at least one panel 100 according to one embodiment of this invention. It should be noted that while a van is shown, this invention will work well with other vehicles including trailers, trucks, sport utility vehicles (SUVs), boats, airplanes, etc. and for other purposes as well. The vehicle 10 may include a vehicle frame 12 and a body 14 that is supported to the frame 12. The body 14 may define a locomotion compartment 18 that may contain at least one locomotion device 20 to provide power to move the vehicle from place to place. The particular locomotion device 20 can be any chosen with the sound judgment of a person of skill in the art. Non-limiting examples include: internal combustion engines (ICEs), electric motors, and hybrids (which typically include both an ICE and an electric motor). The vehicle 10 may include one or more ground engaging wheels 22, side doors 36, a back door or hatch 38 and other conventional components of a vehicle that are known in the art.

Figure 3:
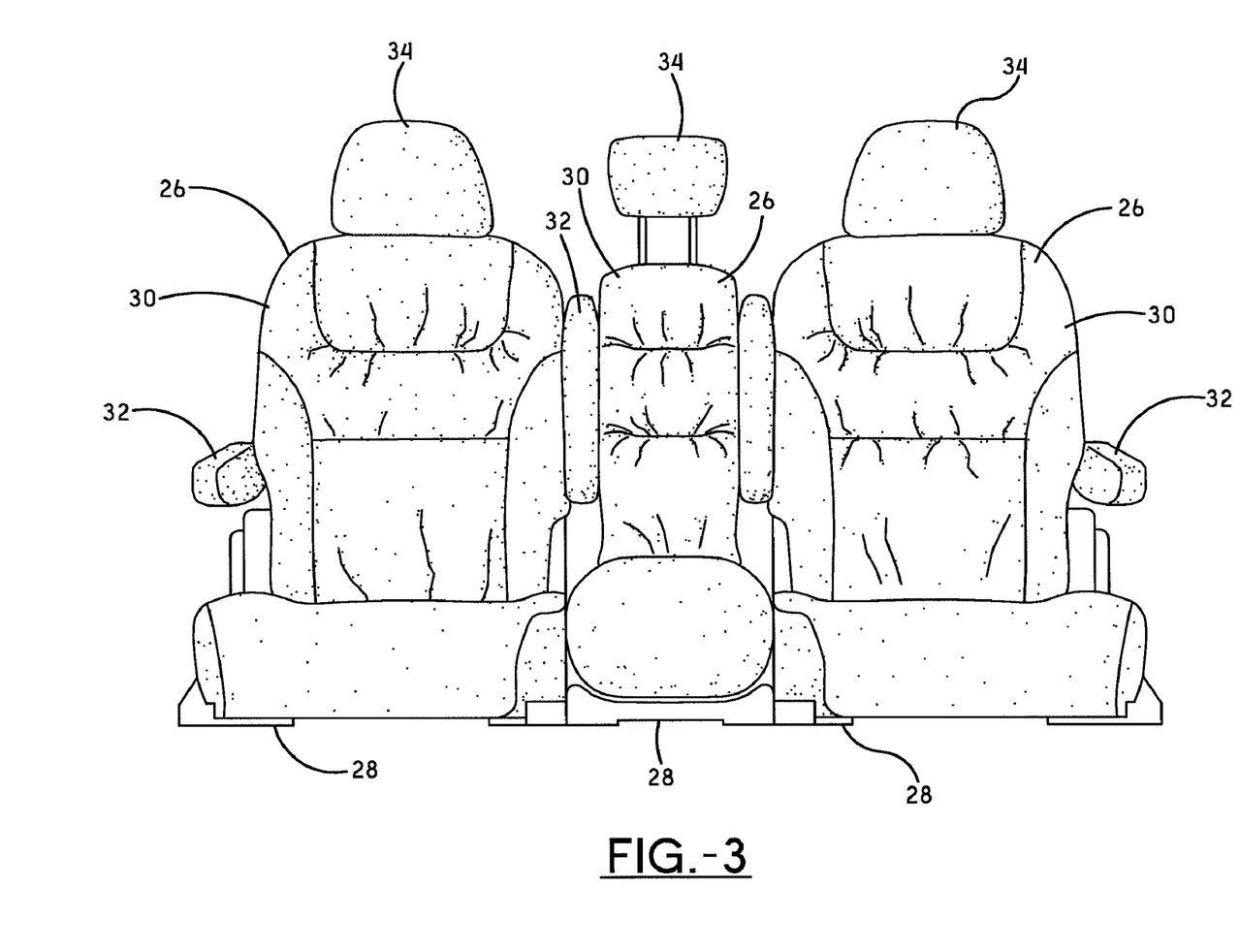
FIG. 3 is a front view of the seat assemblies shown in FIG. 2 shown separated from the rest of the vehicle.

With reference now to FIGS. 1-6, the vehicle body 14 may also define an interior 24 which may include a load floor 40 that is used to support a load, such as persons or cargo, to the vehicle frame 12. The load floor 40 may have a load receiving surface 42 upon which the load is placed. The vehicle 10 may be adjusted into and/or otherwise used in a "bed mode." By bed mode it is meant that at least a portion of the load receiving surface 42 is used to receive one or more persons who desire to rest and/or sleep. The interior 24 may also include one or more vehicle seat assemblies 26. It should be noted that while the seat assemblies shown 26 shown are commonly referred to as a bucket seats (designed to support one person in a sitting position), this invention will work well with other seat assemblies including bench seats (designed to support more than one person in a sitting position) of all sizes and seat surfaces of many types. Each seat assembly 26 may be attachable to the vehicle 10 in any manner chosen with the sound judgment of a person of skill in the art. Each seat assembly 26 may include a seat base portion 28, a seat back portion 30, one or more arm rests 32, and one or more neck braces 34 though it is to be understood that these components are not required for this invention. The use of a seat assembly 26 is only used in one set of embodiments of this invention as will be discussed further below.

Figure 7:
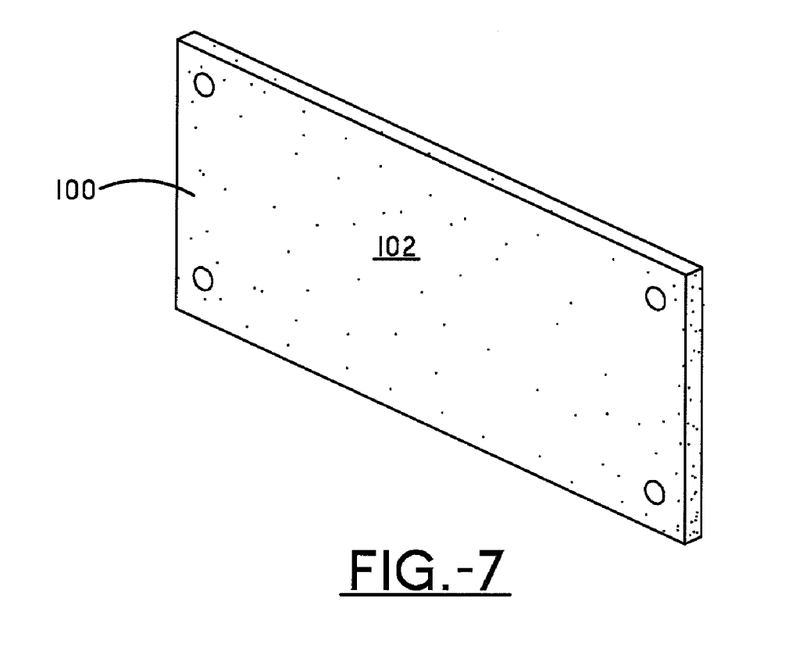
FIG. 7 is a perspective front view of a panel according to one embodiment of this invention.
Figure 8:
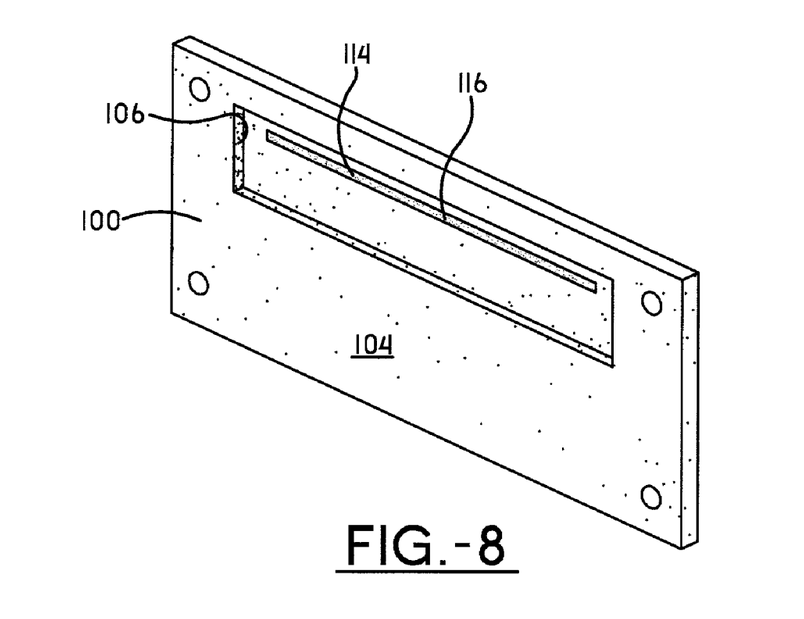
FIG. 8 is a perspective back view of the panel shown in FIG. 7.
Figure 9:
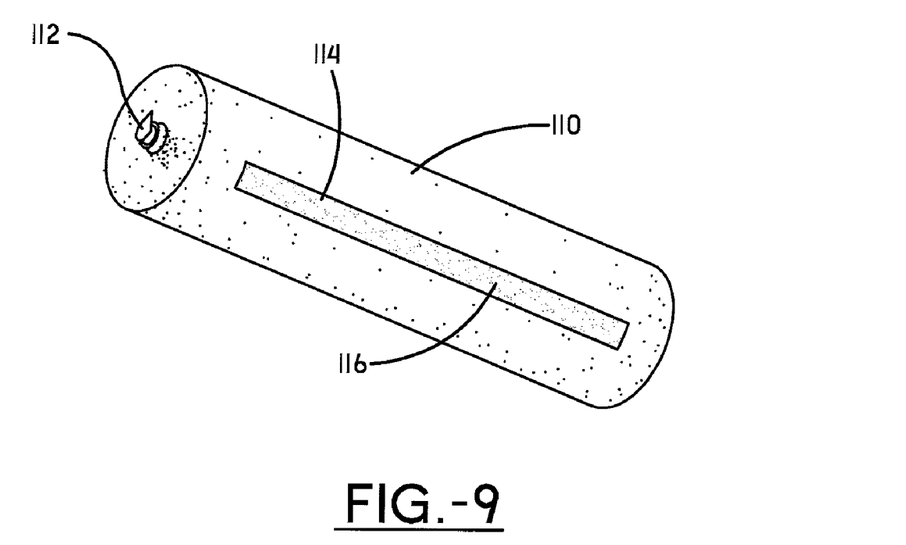
FIG. 9 is a perspective front view of a pillow according to one embodiment of this invention.

With reference now to FIGS. 4-9, the load floor 40 may include one or more panels 100 that can be advantageously adjusted when the vehicle 10 is to be used in a bed mode. More specifically, each panel 100 may be generally planar and may have first and second oppositely facing sides 102, 104. The second side 104 may have a storage cavity 106 that at least partially receives a pillow 110. The pillow 110 can be of any size and style chosen with the judgment of a person of skill in the art. In one embodiment the pillow 110 is inflatable. This embodiment provides for added cargo capacity because the pillow 110 can remain un-inflated (and thus using minimal storage capacity) until it is needed to be used. In this case, a valve stem 112 may be provided so that air or other suitable gas may be inserted into the pillow 110 and released out of the pillow 110. In one embodiment, a releasable fastener 114 may be used to releasably fasten (and unfasten) the pillow 110 to (and from) the second side 104 of the panel 100. In a more specific embodiment, the releasable fastener 114 may be used to releasably fasten the pillow 110 at least partially within the storage cavity 106. While the releasable fastener 114 may be of any type chosen with the judgment of a person of skill in the art, in one specific embodiment the releasable fastener 114 comprises a pair of hook-and-loop faster strips 116. In another embodiment, the releasable fastener 114 comprises a hook-and-eyelet arrangement.

Figure 10:
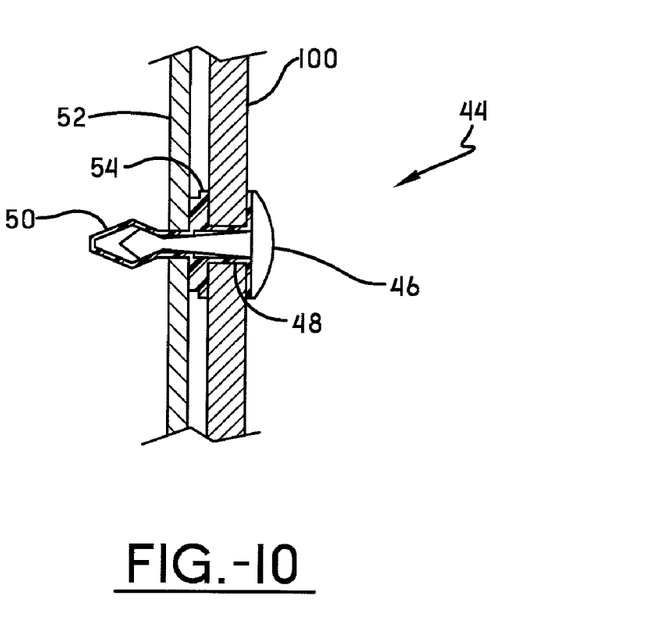
FIG. 10 is a section view of a releasable fastener according to one embodiment of this invention.

With reference now to FIGS. 4-10, each panel 100 may be adjustable between: (1) a first position (shown in FIGS. 2, 4 and 6) where the first side 102 defines at least a portion of the load receiving surface 42 and the second side 104 defines no portion of the load receiving surface 42; and, (2) a second position (shown in FIG. 5) where the first side 102 defines no portion of the load receiving surface 42 and the second side 104 defines at least a portion of the load receiving surface 42. In one embodiment, this adjustment is accomplished simply by turning the panel 100 "over." By turning the panel over it is meant adjusting the panel 100 between a position where the first side 102 faces substantially in one direction to a position where the first side 102 faces substantially in the opposite direction. In one embodiment, one or more releasable fasteners 44 may be used to releasably fasten (and unfasten) the panel 100 to (and from) the load floor 40 (or other surfaces as will be discussed below). While the releasable fastener 44 may be of any type chosen with the judgment of a person of skill in the art, in one specific embodiment shown in FIG. 10 the releasable fastener 44 comprises a clip 46 that extends through an opening 48 in the panel 100 and that is received within a clip attachment 50 formed in another portion of the vehicle 10, such as an underlying steel panel 52. A grommet 54 may be used to protect the panel 100 and the clip 46 and to provide a longer lasting fastener. The number and location of releasable fasteners 44 used can be any chosen with the judgment of a person of skill in the art. For the specific embodiment shown in FIGS. 6-8, four releasable fasteners 44 are used in the four corners of the rectangular panel 100.

With reference now to FIGS. 4-8, each panel 100 may be located according to the judgment of a person of skill in the art. In one embodiment, one or more panels 100 may be located on the load floor 40 behind the seat assemblies 26. In another embodiment, one or more panels 100 may be located on one or more of the seat assemblies 26. In a more specific embodiment, shown in FIGS. 2 and 4-6, a panel 100 may be located on the back surface of the seat back 30.

With reference now to all the FIGURES, the operation of this invention will now be described. If the panel 100 to be adjusted is located on a seat assembly 26, the seat assembly 26 can first be adjusted from the position in which it supports a person in a sitting position (shown in FIG. 2) to a position where the panel 100 is substantially coplanar with at least a portion of the load receiving surface 42 (shown in FIG. 5). This step may include folding the seat assembly 26 in any known manner until the back surface of the seat back 30 is substantially coplanar with at least a portion of the load receiving surface 42. Whether the panel 100 is located on the seat assembly 26 or not, the releasable faster(s) 44 may be adjusted to permit the panel 100 to be moved. The panel 100 is then adjusted between: (1) a first position (shown in FIGS. 2, 4 and 6) where the first side 102 defines at least a portion of the load receiving surface 42, the second side 104 defines no portion of the load receiving surface 42, the pillow 110 is at least partially received within the storage cavity 106 and, the pillow 110 is hidden (it is attached to the second side 104 of the panel 100 now facing away from the user and thus cannot be seen or used); and, (2) a second position (shown in FIG. 5) where the first side 102 defines no portion of the load receiving surface 42, the second side 104 defines at least a portion of the load receiving surface 42 and, the pillow 110 is not hidden (it is attached to the second side 104 of the panel 100 now facing toward the user and thus can be seen and used). The releasable faster(s) 44 may then be adjusted to fasten the panel 100 in the second position. The pillow 110 if un-inflatable can now be used. If the pillow 110 is inflatable, it can be inflated before being used. The pillow 110 can be released from the panel 100 with the releasable fastener 114 for any reason (such as to inflate the pillow 110, or to move the pillow 110 to a more desirable location) as needed.

With continuing reference to all the FIGURES, to return the pillow 110 to the storage position, it can be deflated (if it is inflatable). The pillow 110 is then fastened (using releasable fastener 114) to the second side 104 of the panel 100. The releasable faster(s) 44 may then be adjusted to permit the panel 100 to be moved from the second position (shown in FIG. 5) back to the first position (shown in FIGS. 2, 4 and 6) where again the pillow 110 is hidden. The releasable faster(s) 44 may then be adjusted to fasten the panel 100 in the first position. If the panel 100 is located on a seat assembly 26, the seat assembly 26 can be adjusted back into the position in which it supports a person in a sitting position (shown in FIG. 2).

Numerous embodiments have been described, hereinabove. It will be apparent to those skilled in the art that the above methods and apparatuses may incorporate changes and modifications without departing from the general scope of this invention. It is intended to include all such modification and alterations in so far as they come within the scope of the appended claims or the equivalents thereof.

What is claimed is:

1. A vehicle comprising:
    a frame;
    an interior comprising:
        a load floor having a load receiving surface that is supported to the frame;
        a first panel having first and second sides, the second side comprising a storage cavity;
        wherein the first panel is adjustable between: (1) a first position where the first side defines at least a portion of the load receiving surface and the second side defines no portion of the load receiving surface; and, (2) a second position where the first side defines no portion of the load receiving surface and the second side defines at least a portion of the load receiving surface;
        a first pillow;
        wherein when the first panel is in the first position, the first pillow is at least partially received within the storage cavity and, the first pillow is hidden; and,
        wherein when the first panel is in the second position, the first pillow is not hidden.

2. The vehicle of claim 1 further comprising:
    a releasable fastener that releasably fastens the first pillow to the second side of the panel at least partially within the storage cavity.

3. The vehicle of claim 1 further comprising:
    a releasable fastener that releasably fastens the first panel into the first and second positions.

4. The vehicle of claim 1 wherein the first pillow is inflatable.

5. The vehicle of claim 1 wherein:
    the interior comprises: a first seat assembly that supports an associated person in a sitting position and that is supported to the frame; and,
    the first seat assembly comprises the first panel.

6. The vehicle of claim 5 wherein:
    the first seat assembly comprises a seat base portion and a seat back portion; and,
    the seat back portion comprises the first panel.

7. The vehicle of claim 5 further comprising:
    a second seat assembly that supports an associated person in a sitting position and that is supported to the frame within the interior.

8. The vehicle of claim 1 further comprising:
    a locomotion source supported to the frame for use in providing locomotion for the vehicle;
    a seat assembly that supports an associated person in a sitting position and that is supported to the frame within the interior; and,
    at least a first ground engaging wheel supported to the frame.

9. The vehicle of claim 1 wherein the interior further comprises:
    a second panel having first and second sides, the second side comprising a storage cavity;
    wherein the second panel is adjustable between: (1) a first position where the first side defines at least a portion of the load receiving surface and the second side defines no portion of the load receiving surface; and, (2) a second position where the first side defines no portion of the load receiving surface and the second side defines at least a portion of the load receiving surface;
    a second pillow;
    wherein when the second panel is in the first position, the second pillow is at least partially received within the storage cavity and, the second pillow is hidden; and,
    wherein when the second panel is in the second position, the second pillow is not hidden.

10. The vehicle of claim 1 wherein the first pillow is at least partially received within the storage cavity when the first panel is in the second position.

11. A method comprising the steps of:
    (A) providing a vehicle comprising: a frame; a locomotion source supported to the frame for use in providing locomotion for the vehicle; and, an interior comprising a load floor having a load receiving surface that is supported to the frame;
    (B) providing a panel having first and second sides, the second side comprising a storage cavity;
    (C) providing a pillow; and,
    (D) adjusting the panel: (1) from a first position where the first side defines at least a portion of the load receiving surface, the second side defines no portion of the load receiving surface, the pillow is at least partially received within the storage cavity and, the pillow is hidden; (2) to a second position where the first side defines no portion of the load receiving surface, the second side defines at least a portion of the load receiving surface and, the pillow is not hidden.

12. The method of claim 11 wherein after step (D) the method comprises the step of:
    adjusting the panel back to the first position where the first side defines at least a portion of the load receiving surface, the second side defines no portion of the load receiving surface, the pillow is at least partially received within the storage cavity and, the pillow is hidden.

13. The method of claim 11 wherein step (D) comprises the step of:
    adjusting a releasable fastener to unfasten the pillow from the second side of the panel.

14. The method of claim 11 wherein step (D) comprises the steps of:
    adjusting a releasable fastener to unfasten the panel from the first position; and,
    readjusting the releasable fastener to fasten the panel into the second position.

15. The method of claim 11 wherein after step (D) the method comprises the step of:
    inflating the pillow.

16. The method of claim 11 wherein:
step (A) comprises the step of: providing the interior with a seat assembly that supports an associated person in a sitting position and that is supported to the frame;
step (B) comprises the step of: providing the panel as part of the seat assembly; and,
prior to step (D) the method comprises the step of: adjusting the seat assembly so that the panel is substantially coplanar with at least a portion of the load receiving surface.

17. The method of claim 11 wherein:
step (A) comprises the step of: providing the seat assembly with a seat base portion and a seat back portion;
step (B) comprises the step of: providing the panel as part of the seat back portion; and,
the step of adjusting the seat assembly so that the panel is substantially coplanar with at least a portion of the load receiving surface, comprises the step of: pivoting the seat back portion with respect to the seat base portion.

18. A vehicle comprising:
a frame;
a locomotion source supported to the frame for use in providing locomotion for the vehicle;
at least a first ground engaging wheel supported to the frame;
an interior comprising:
 a first seat assembly that supports an associated person in a sitting position and that is supported to the frame;
 a second seat assembly that is supported to the frame, the second seat assembly comprising a panel having first and second sides, the second side comprising a storage cavity;
 a load floor having a load receiving surface that is supported to the frame;
 wherein the second seat assembly is adjustable between: (1) a first position where the second seat assembly supports an associated person in a sitting position; and, (2) a second position where the panel is substantially coplanar with at least a portion of the load receiving surface;
 wherein the panel is adjustable when the second seat assembly is in the second position between: (1) a first position where the first side defines at least a portion of the load receiving surface and the second side defines no portion of the load receiving surface; and, (2) a second position where the first side defines no portion of the load receiving surface and the second side defines at least a portion of the load receiving surface;
 a pillow;
 wherein when the panel is in the first position, the pillow is at least partially received within the storage cavity and, the pillow is hidden; and,
 wherein when the panel is in the second position, the pillow is not hidden.

19. The vehicle of claim 18 further comprising:
a releasable fastener that releasably fastens the pillow to the second side of the panel at least partially within the storage cavity;
a releasable fastener that releasably fastens the panel into the first and second positions; and,
wherein the pillow is inflatable.

20. The vehicle of claim 18 wherein:
the first seat assembly comprises a seat base portion and a seat back portion; and,
the seat back portion comprises the panel.

* * * * *